Patented June 11, 1940

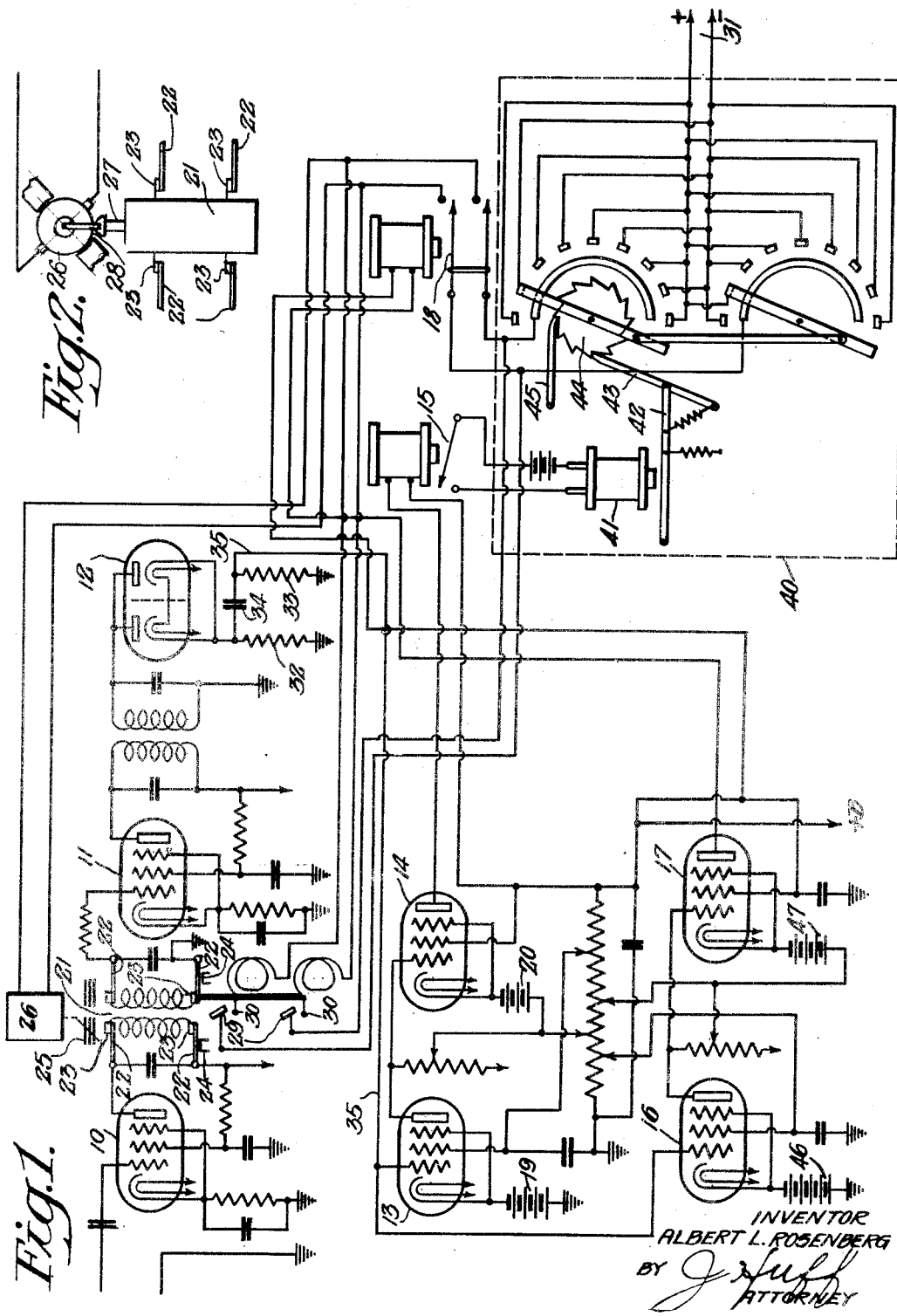

2,203,878

UNITED STATES PATENT OFFICE 2,203,878

ELECTRICAL TESTING SYSTEM

Albert L. Rosenberg, Oaklyn, N. J., assignor to Radio Corporation of America, a corporation of Delaware Application August 5, 1937, Serial No. 157,472

8 Claims. (Cl. 175—183)

This invention relates to electrical testing systems such as are useful in adjusting the electrical constants of high frequency transformers or similar devices, and has for its principal object the provision of an improved apparatus and method of operation whereby successively tested devices may be rapidly and automatically adjusted to have the same electrical characteristics.

Other objects of the invention are the provision (1) of an improved apparatus for automatically adjusting high frequency transformers to resonance at a predetermined frequency, (2) of an improved control circuit which responds solely to a change in the value or polarity of its control potential to effect adjustments of this character, and (3) of an improved control circuit which responds in one direction to an increase and in the other direction to a decrease of control potential regardless of the absolute value or frequency of the control potential.

In the manufacture of different types of electrical apparatus such as transformers, capacitors, inductors, wave traps, oscillation generators and the like, it is frequently desirable to utilize similar component parts which have the same electrical constants.

In the manufacture of radio receivers, for example, it is desirable that the coupling transformers be adjusted to resonate at some predetermined frequency. This result is commonly produced by means of a screw fixed to a molded magnetite transformer core which is so adjusted with respect to its surrounding coils as to change the inductance of these coils to the desired value. Thus, the core adjusting screw is turned in one direction to increase the coil inductance and the opposite direction to decrease the coil inductance. Similar adjustment is frequently required in many other types of apparatus.

In the exemplified embodiment of the invention, such adjustment of a transformer core is effected by means including a reversible motor provided with a control circuit which functions to (1) produce rotation of the motor in one direction when the transformer output is increasing, (2) produce rotation of the motor in the opposite direction when the transformer output is decreasing and (3) deenergize the motor when the transformer output attains a constant value. In order that an initial variation in the transformer output may be produced when the transformer terminals are moved into engagement with the contacts of the test circuit, the control circuit is also provided with means for temporarily energizing the core adjusting motor to initiate the automatic operation of the control circuit. While the invention is illustrated and described as applied to the adjusting or testing of a coupling transformer, it will be apparent that it is equally applicable to the adjustment of various other types of apparatus which depend for their adjustment on change in the position of a core, a plate or otherwise shaped member adapted to produce an electrical effect.

The invention will be better understood from the following description when considered in connection with the accompanying drawing and its scope is indicated by the appended claims.

Referring to the drawing,

Figure 1 is a wiring diagram of the improved test system, and

Figure 2 illustrates a detail of the relation between the adjusting motor and the transformer under test.

As hereinafter explained in greater detail, the illustrated system includes a control circuit from which control potential is applied to a pair of amplifying channels, one of which operates to maintain one solenoid-operated switch closed only while the control potential is increasing and the other of which operates to maintain another solenoid-operated switch closed only while the control potential is decreasing. Interconnected with these two solenoids is a relay device which functions to reverse the connections of the adjusting motor so that the tested device is automatically adjusted to the desired electrical condition.

The system includes (1) a test channel which comprises intercoupled amplifiers 10 and 11 and a detector 12 and (2) a control circuit which comprises a pair of amplifiers 13 and 14 for controlling a solenoid-operated switch 15 and a pair of amplifiers 16 and 17 for controlling a solenoid-operated switch 18. As hereinafter explained in greater detail, the amplifiers 16 and 17 are negatively biased by means of potential sources 46 and 47 and have their input circuits so interconnected with the output circuit of the detector 12 that the solenoid 18 is closed when the detector output increases and amplifiers 13 and 14 are negatively biased by means of potential sources 19 and 20 and have their input circuits so interconnected with the output of detector 12 that the solenoid 15 is closed when the detector output decreases.

The transformer 21 to be tested is shown as connected between the output circuit of amplifier 10 and the input circuit of amplifier 11. In order to facilitate ready insertion and removal of the tested transformer 21, any suitable means may be utilized to establish the desired connections. Such means are illustrated as springs or resilient terminals 22 which are fixed at one end and have their other end biased upwardly and arranged to be pressed downwardly by the transformer terminals 23, the extent of the downward travel of the movable ends being determined by means of stops 24 or the like. The transformer core 25 to be adjusted is shown diagrammatically as mechanically coupled to an adjusting motor 26.

As shown more particularly in Fig. 2, the core of the transformer 21 is provided with an adjusting screw 27 arranged to be rotated in either direction by an extension 28 of the shaft of the motor 26.

Also associated with one set of the upwardly biased resilient contacts 22 is a switch 29—30 which functions to connect the motor 26 through a relay device 40 to its current supply leads 31 for a short interval such as one second immediately following the connection of the transformer in the test circuit, this momentary completion of the test motor circuit being desirable for producing in the detector output circuit a change which will initiate operation of the motor control circuit. In the operation of the switch 29—30, the contacts 30 move downwardly over the sloped surface of the contacts 29 when the transformer is inserted and move upwardly over the insulation back of the contact 29 when the transformer is removed.

It will be observed that the detector output circuit includes resistors 32 and 33 and a capacitor 34 and that the control grids of the amplifiers 13 and 16 are connected through lead 35 to the high potential side of the resistor 33. With these connections, the control grids of the amplifiers are subjected to a more positive potential when the detector output is increasing and to a more negative potential when the detector output is decreasing. As previously indicated the bias potentials of the amplifiers are such that the switch 18 closes in response to increasing potential and the switch 15 closes in response to decreasing potential.

If the detector output is increasing, current is supplied to the solenoid which closes the switch 18 thus connecting the supply leads 31 to the motor 26. This motor is operated in one direction until change in the detector output ceases at resonance for the particular test frequency applied to the input of the amplifier 10. At the resonant point, the solenoid 18 is therefore de-energized, the switch 37 opens and the motor 26 stops.

If the detector output is decreasing, the switch 15 closes, thus energizing the operating solenoid 41 of the relay device 40 and operating the ratchet mechanism 42—43—44—45 one notch in a well known manner to reverse the polarity of the connections of the adjusting motor 26 to the power supply line 31 and reversing the rotation of the motor. This causes operating current to be supplied to the switch 18 and the transformer is adjusted to resonance as previously explained. This operation of the motor in the opposite direction continues until change in the detector output ceases when resonance occurs and the solenoid switch 18 opens, thus stopping the motor 26.

It will be apparent from the foregoing explanation that the invention provides a ready means for rapidly and automatically adjusting electrical devices to a predetermined electrical condition and that it may assume various forms other than that illustrated and described.

I claim as my invention:

1. The combination of a test channel adapted to receive a device to be tested, means for adjusting said device in one direction in response to an increase in the output of said channel and in the opposite direction in response to a decrease in said output, and means responsive to the insertion of said device in said channel for producing a momentary initial variation in said output.

2. The combination of a test channel adapted to receive a device to be tested and provided with an output circuit, means including a capacitor connected in said output circuit, means responsive to the charging of said capacitor for adjusting said device in one direction, and means responsive to the discharge of said capacitor for adjusting said device in another direction.

3. The combination of a test channel adapted to receive a device to be tested and provided with an output circuit, means including a capacitor connected in said output circuit, means responsive to the charging of said capacitor for adjusting said device in one direction, means responsive to the discharging of said condenser for adjusting said device in another direction, and means for producing an initial change in the charge of said capacitor.

4. The combination of a test channel adapted to receive a transformer to be tested and provided with an output circuit, means including a capacitor connected in said output circuit, and means responsive to change in the charge of said capacitor for adjusting the resonance of said channel.

5. The combination of a test channel adapted to receive a transformer to be tested and provided with an output circuit, means including a capacitor connected in said output circuit, means responsive to change in the charge of said capacitor for adjusting the inductance of said transformer to resonance in said channel, and means responsive to the insertion of said transformer in said channel for producing an initial change in the charge of said capacitor.

6. The combination of a test channel adapted to receive an electrical device to be tested and provided with an output circuit, means for supplying a signal to said channel, means including a capacitor connected in said output circuit, and means responsive to change in the charge of said condenser for adjusting an electrical constant of said device.

7. The combination of a test channel adapted to receive an electrical device to be tested and provided with an output circuit, means for supplying a signal to said channel, means including a capacitor connected in said output circuit, and means responsive to change in the charge of said capacitor for adjusting said device to resonance at the frequency of said signal.

8. The combination of a test channel provided with an output circuit and adapted to receive an impedance device to be adjusted to resonance in said channel, impedance means connected in said output circuit, and means responsive to the voltage of said impedance means for automatically adjusting the impedance of said device to resonance in said channel.

ALBERT L. ROSENBERG.